United States Patent [19]

Thoma

[11] 4,231,989

[45] Nov. 4, 1980

[54] MULTICHANNEL SYSTEM FOR THE HANDLING OF IMMOBILIZED BIOLOGICALLY ACTIVE SUBSTANCES

[75] Inventor: Hans A. Thoma, Munich, Fed. Rep. of Germany

[73] Assignee: Chandon Investment Planning Ltd., Cayman Island

[21] Appl. No.: 899,710

[22] Filed: Apr. 24, 1978

[30] Foreign Application Priority Data

Apr. 29, 1977 [DE] Fed. Rep. of Germany ....... 2719234

[51] Int. Cl.2 ............................................ G01N 1/14

[52] U.S. Cl. .................................... 422/63; 422/100; 422/102; 422/103; 422/104; 141/130

[58] Field of Search .................... 422/63, 65, 66, 102, 422/103, 104, 100; 195/127; 141/130

[56] References Cited

U.S. PATENT DOCUMENTS

| | | | |
|---|---|---|---|
| 3,650,306 | 3/1972 | Lancaster | 422/100 |
| 3,723,066 | 3/1973 | Moran | 422/66 |
| 4,087,248 | 5/1978 | Miles | 422/63 |

*Primary Examiner*—R. E. Serwin
*Attorney, Agent, or Firm*—Schwartz, Jeffery, Schwaab, Mack, Blumenthal & Koch

[57] ABSTRACT

Disclosed is a multichannel system for the handling of immobilized biologically active substance, in which several test tubes are filled with at least one reaction liquid. The automated handling of a large number of samples in the shortest possible time is made possible by this system.

10 Claims, 2 Drawing Figures

MULTICHANNEL SYSTEM FOR THE HANDLING OF IMMOBILIZED BIOLOGICALLY ACTIVE SUBSTANCES

TECHNICAL FIELD OF THE INVENTION

The invention concerns a multichannel system for the handling of immobilized biologically active substance, in which several test tubes are filled with at least one reaction liquid. The automated handling of a large number of samples in the shortest possible time is made possible by this system.

With devices of the type described in the present invention, the hormone content of human serum, for example, can be determined in hospitals, in large numbers and, in the shortest possible time.

BACKGROUND OF THE PRIOR ART

Devices known heretofore, such as automatic pipetting machines or automated flow systems, all have the great disadvantage that they operate in series only. Because each sample to be analyzed must be subjected to a series of process steps, such as pipetting, centrifuging, contacting with a reaction liquid, etc., it has not been possible in the past to provide a device which would subject a large number of samples simultaneously and parallel to each other to the necessary steps of the process.

The introduction of the so-called "solid phase" technique, in which the liquid sample to be examined is placed into contact with a solid substance of an immobilized, biologically active material, made possible the application of a flow system. This greatly simplified the analytical procedure and facilatated its execution. The speed and the capacity of this technique is, however, again limited by the fact that the individual samples must be handled in sequence.

SUMMARY OF THE INVENTION

To overcome the difficulties of the prior art, it is an object of the present invention to provide a device capable of performing the simultaneous and parallel analysis of a greater number of samples.

Accordingly, the invention consists of a multichannel system comprising a device having a horizontally arranged receiving plate for supporting and/or carrying test tubes in a regular arrangement, an adapter plate with holders arranged above the receiving plate in which the test tubes are held by clamping action when the receiving plate and the adapter plate are moved within a suitable distance with respect to each other. Each of the holders is connected by means of a channel of narrow configuration when compared with the holder, with a means for applying a negative or positive pressure to the channel. The means may comprise, for example, a single multichannel displacer pump capable of operating selectively as either a suction pump or a pressure pump. A carrier plate is provided upon which recesses or receptacles for the liquid samples to be analyzed, are located in an order corresponding to the order of the test tubes and the carrier plate is interchangeable with the receiver plate. The combination of these characteristics creates a truly multichannel system, in which a field of test tubes arranged approximately in the form of a matrix on a receiving plate is connected simultaneously and in a single step with an adapter plate and by exchanging the receiver plate with a carrier plate, each of the test tubes is placed into contact with a sample to be analyzed. Thus, the invention also concerns a method of simultaneously analyzing several test tube samples by means of the multichannel system. In this method, the switching of the displacer pump operating forward and in reverse, i.e. applying negative pressure then positive pressure, allows the sample first to be suctioned into the test tube and may then be treated with different reaction liquids.

According to a further development of the invention, the carrier plate consists of a backing block with borings and a relatively rigid sheet is placed upon the backing block, said rigid sheet displaying recesses at the location of the borings, in order to receive the liquid samples. The use of a "throw-away" foil plate to receive the samples further accelerates the analytical procedure, because the cumbersome cleaning of test vessels is eliminated.

The test tubes consist preferably of a flexible material and expand conically upward. The inlet area of the test tubes have a funnel-shaped inlet area and a cylindrical holding area, the diameter of which is smaller than the largest diameter of the samples. These characteristics result in a reliable connection of the test tubes with the adapter plate. During use, the flow of fluid through the test tube developes considerable pressure because of the high resistance to flow of the sample in the tubes. Accordingly, an absolutely secure connection between the tubes and the adapter plate is necessary.

In a preferred arrangement, the test tubes are of a length such that, following the removal of the backing block, the tubes may be removed from the holders by tilting them. These characteristics make it possible to commonly secure all of the test tubes arranged in a straight line by a suitable rack, where upon rotation of the rack from the vertical plane, the test tubes are tilted and the clamping action released. Upon release, the test tubes then drop into the rack. The touching of the test tubes by hand, and the danger of interchanging are thereby avoided.

In accordance with a further feature of the present invention, the test tubes display at their outer circumferences shoulder-like protrusions by which they are seated on the edge of the receiving plate. The tubes must be introduced into the adapter plate with a certain force in order to reliably establish the clamping action. The shoulder at the outer circumference of the tube prevents the jamming of the tube in the adapter plate under the effect of the necessary force.

The pressure displacer means may be a conventional tube pump capable of operating in both the forward and reverse mode. In a preferred embodiment, however, it consists of a series of piston and cylinder units operated together, the units being connected by means of tubing with the holders of the adapter plate. It is of advantage to mount the pistons on one plate, and the cylinders on another plate displaceable with respect to each other, in a parallel manner. This insures an absolutely synchronous and accurate guidance of the piston-cylinder units. The design is particularly simple when the piston-cylinder units consist of airtight precision injectors.

During operation of certain analyses, it may be necessary to charge the sample with two reaction liquids separately. For this purpose, a second narrow channel opens into each of the holders, said second channel being connected with a second multichannel displacer pump. A second reaction liquid may be added through this additional channel independently of the first liquid.

The device of the invention represents a true multichannel system, signifying a breakthrough in the automation of the analysis of serum samples of solid phase techniques.

BRIEF DESCRIPTION OF THE DRAWING

In the following preferred embodiment of the invention is described with the aid of the attached drawing.

Figure 1:
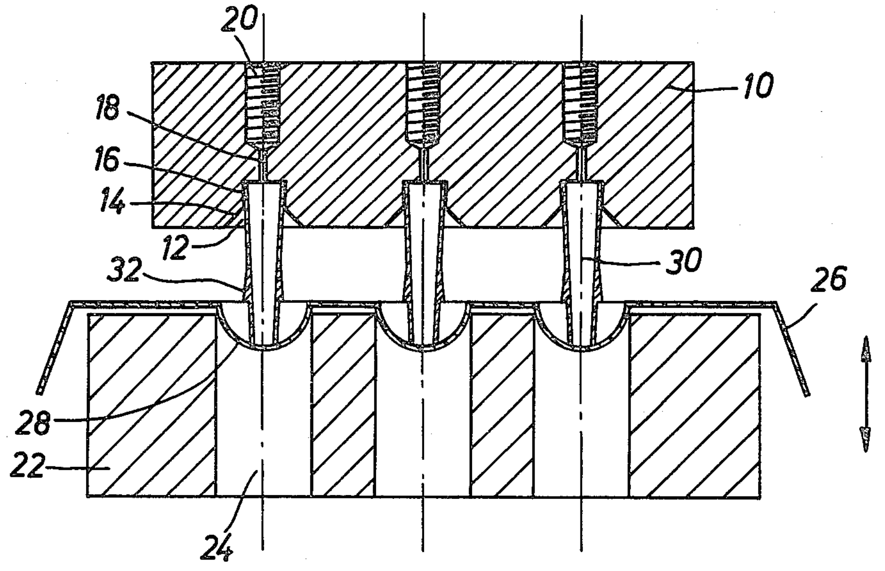
FIG. 1 illustrates a schematic cross section through two essential parts of the device.

The device of the invention as demonstrated in FIG. 1 consists of a stationary and horizontally arranged adapter plate 10. Several holders 12 are provided on the underside of the adapter plate in a certain geometric arrangement. As a rule, the holders are arranged at the intersections of a perpendicularly intersecting matrix of lines at a suitable distance from each other.

The holders 12 consist of a funnel-shaped inlet area 14 and a cylindrical holding area 16. A narrow channel 18 follows the holding area 16 in the upward direction, said channel leading into the boring 20 which is equipped with internal threads. A suitably shaped adapter plug (not shown) may be screwed into the boring 20. In the center axis of such an adapter plug, a tube is provided with a diameter corresponding roughly to that of the channel 18. When the plug is screwed in the boring 20, the channel 18 connects directly with the tube arranged in the center of the plug (tube not shown). The tubes, connected on one end with the adapter plug, are connected at their other end each with the cylinder space of a piston-cylinder unit (not shown). Accordingly, the number of separate piston-cylinder units corresponds exactly to the number of the boring 20 and the number of holders 12.

The pistons on the one hand and the cylinders on the other, are mounted on separate plates aligned parallel to each other, with one plate being displaceable with respect to the other. The displacement takes place preferably by means of a spindle drive and is controlled by a suitable control device. According to one form of embodiment, airtight precision injectors were most successful as the piston-cylinder units. The volume of the cylinder is dimensioned so that it is sufficient for several analysis. The cylinders are filled with a certain reaction liquid which is then gradually released through the test tubes depending from the particular test procedure.

Underneath the adapter plate 10 in FIG. 1, a carrier plate 22 is arranged, again horizontally. The carrier plate 22, as indicated by the dual arrow, may be adjusted in the vertical direction. The adjustment is performed preferably by hydraulic means (not shown) and is controlled by a suitable regulating device with respect to lift, cycle and feed velocity. Borings 24 are arranged in the backing block, with their center axes coinciding with the center axes of the holders 12. Each holder 12 is thus in an aligned relationship with a boring 24. A sheet 26 with bowl-like recesses 28 is provided to initially receive the sample liquid. It is of importance here that the recesses 28 are suspended freely in the borings 24. Because the sheet consists of a flexible plastic material, it is able to give somewhat under compressive stresses.

Test tubes 30 are inserted in the holders 12, i.e. their cylindrical holding areas 16, and are secured there through clamping action. The upper external diameter of the test tubes is slightly larger than the internal diameter of the holding area 16. During the insertion of the test tubes 30 into the holders, the upper part of the test tubes 30 is thus deformed, producing a holding force of sufficient magnitude to hold the tubes in their holders 12 even under compressive stress.

Figure 2:
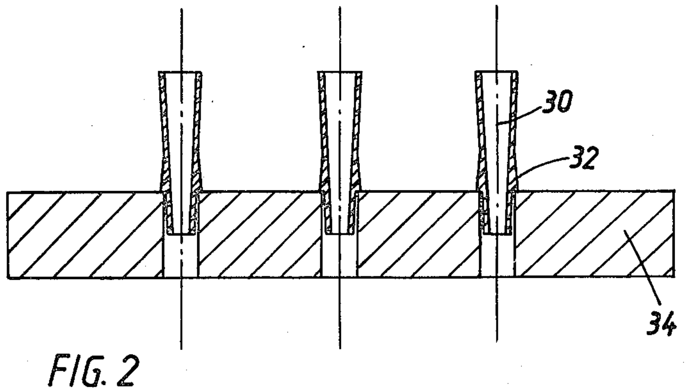
FIG. 2 illustrates a schematic cross section through the receiver plate of the device.

The backing block 22 can be replaced with a receiving plate 34 (FIG. 2). The receiving plate contains a series of borings, with their center axes again conincid-ing with the center axes of the holders 12. The diameter of the borings is chosen so that the lower part of the test tubes 30 can be introduced in the borings with a certain play. At the lower part of the test tubes 30, a shoulder 32 is formed which seats upon the edge of the borings of the receiving plate and which prevents the jamming of the test tubes into the borings of the receiving plate under the pressure acting from above upon the test tubes.

The method of conducting an analysis with the above-described system proceeds as follows.

The test tubes are first prepared, i.e., filled with a solid biologically active substance in the following manner. The test tubes 30 are inserted initially in the borings of the receiving plate 34. The receiving plate is then placed on the guide or mounting of the hydraulic lifting device of the apparatus (not shown) whereupon the center axes of the bores and the center axes of the holders 12 coincide. When the receiving plate is lifted, the upper edge of the test tubes 30 is gripped by the inlet area 14 of the holders 12 and finally arrives in the cylindrical holding area 16, into which the test tubes 30 are slid up to the upper stop. Subsequently, the receiving plate descends, while the test tubes 30 remain suspended in the holders 12, due to the fact that the jamming of the test tubes into the receiving plate was prevented by the function of the shoulder 32.

Following the introduction of the test tubes, the receiving plate 34 is taken from the apparatus and replaced by the backing block 22. The sheet 26 is now resting upon said backing block and the recesses 28 of said sheet are containing the serum samples. The backing block 22 is lifted by the lifting device (not shown) until the lower end of the test tubes 30 rests upon the bottom of the recesses 28, said bottom being slightly deformed in the process.

The next step is the suctioning of the serum samples into the test tubes. For this purpose, the pistons of the precision injectors are slightly withdrawn, resulting in the creation of reduced pressure inside the tubes and thus in the suctioning of the liquid sample into the tubes. If, for example, the determination of the proportion of hormone in blood serum is involved with a dry antibody powder as the biologically active substance, a pause interval follows during which the antibody powder swells together with the serum sample into a gel, while the reaction of the antibody with the hormone to be determined and the marked hormone takes place.

After the reaction time required, the pistons of the precision injectors are again moved forward, leading to the rinsing of the test tubes 30. The rinsing with a suitable liquid results in the elution of the sample, i.e. to the flushing of the portions of hormones not bound by the antibody, marked and unmarked. For this purpose, the adapter plate can be modified so that instead of one channel 18, two such channels open into the holder 12. The second channel is connected with a second separate displacer pump and may therefore be charged entirely independently. In one especially pertinent example of use, i.e., the radioimmuno assay technique, the tracer solution is first pumped into the sample, allowed to act upon said sample and then a buffer solution is added only following this action by way of the channel 18. The buffer solution serves to extract the sample and separate the bound and unbound tracers.

Either before or after the completion of the extraction, the backing block 22 is made to descend so that the test tubes 30 are suspended freely under the adapter plate. The test tubes 30 are now gripped by a specially designed test tube holder, released from the holders 12 of the adapter plate 10 and moved to a device for further analysis by determining the radioactivity of the samples.

The test tube holder to release the test tubes is preferably of a configuration providing mountings for the test tubes arranged along a line so that their center axes coincide with the center axes of the holders 12, when the holders are arranged in a straight line. The holder is then pushed from below over the test tubes 30 and, following contact with the adapter 10, rotated out of the center plane until the test tubes are released by the holders 12. This is made possible on the one hand by the flexible material of which the test tubes are made and on the other by a suitable lever action. This method of removing the test tubes from the adapter plate prevents accidental interchange of the tubes, as well as contamination of the tubes.

Obviously, the method of operation of the device described may be varied in view of the type of analysis required. The number of tubes arranged in one adapter plate 10 may also be varied arbitrarily. In one example of the invention, multichannel pumps with up to 92 channels have been developed.

What is claimed is:

1. Multichannel system for the handling of solid immobilized, biologically active substances comprising:

- a horizontally arranged receiving plate loosely carrying a plurality of sample tubes open at both ends in a regular arrangement, said tubes containing solid immobilized biologically active substances;
- an adapter plate with a plurality of holders arranged above the receiving plate, said adapter plate coming into communication with the sample tubes by means of clamping engagement with said holders when the receiving plate and the adapter plate are moved together at a suitable distance with respect to each other;
- a plurality of channels, in the adapter plate connected to one holder and of narrow configuration when compared with the holder;
- a multichannel displacer pump, working alternatively as suction pump or pressure pump, said pump connected to said channels;
  - a carrier plate having a plurality of recesses for holding samples to be analyzed each of said recesses positioned to correspond to one of the sample tubes, said carrier plate being exchangeable with said receiving plate;
  - means for exchanging said receiving plate with said carrier plate.

2. The multichannel system of claim 1, wherein the carrier plate consists of a backing block with a plurality of borings and disposed upon the backing block, a relatively rigid sheet having recesses at the locations of the borings to receive the samples to be analyzed.

3. The multichannel system of claims 1 or 2, wherein the sample tubes consist of a flexible material and extend conically upward and the holders possess a funnel-shaped inlet area and a cylindrical holding area, the diameter of the cylindrical holding area being smaller than the largest external diameter of the sample tube.

4. The multichannel system of claim 3, wherein the sample tubes are of a length such that after the removal of the backing block they may be released from the holders by tilting.

5. The multichannel system of claim 4, wherein the sample tubes possess a shoulder formed on the external circumference for seating engagement on the edge of the borings arranged on the receiver plate.

6. The multichannel system of claim 1, wherein the displacer pump is a tube pump capable of operating in both forward and reverse.

7. The multichannel system of claim 1, wherein the displacer pump is a pump consisting of a series of piston-cylinder units operated together, said units being connected by means of tubing with the holders of the adapter plate.

8. The multichannel system of claim 7, wherein the pistons and the cylinders are mounted on plates displaceable in a parallel manner with respect to each other.

9. The multichannel system of claims 7 or 8, wherein the piston-cylinder units are airtight precision injectors.

10. The multichannel system of claim 1, wherein a second channel terminates in each of the holders, said second channel being connected with a second displacer pump.

* * * * *